(12) United States Patent
Gretsch

(10) Patent No.: US 7,463,943 B2
(45) Date of Patent: Dec. 9, 2008

(54) METHOD AND DEVICES FOR AUTOMATICALLY SUPPLYING MATERIAL TO A PROCESSING MACHINE

(75) Inventor: Harald Karl Gretsch, Eibelstadt (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 65 days.

(21) Appl. No.: 10/529,416

(22) PCT Filed: Aug. 21, 2003

(86) PCT No.: PCT/DE03/02781

§ 371 (c)(1), (2), (4) Date: Mar. 30, 2005

(87) PCT Pub. No.: WO2004/031873

PCT Pub. Date: Apr. 15, 2004

(65) Prior Publication Data

US 2006/0053068 A1    Mar. 9, 2006

(30) Foreign Application Priority Data

Sep. 30, 2002   (DE) ............................... 102 45 658

(51) Int. Cl.
- G06F 19/00 (2006.01)
- G06F 7/00 (2006.01)
- B65H 19/00 (2006.01)
- B65H 67/00 (2006.01)

(52) U.S. Cl. ................. 700/122; 700/100; 700/108; 700/127; 700/213; 242/558

(58) Field of Classification Search ............. 700/97, 700/100, 108, 112–114, 122–127, 129, 169, 700/174, 213, 228; 226/9, 10, 24, 45; 242/554, 242/558, 559, 560
See application file for complete search history.

(56) References Cited

U.S. PATENT DOCUMENTS

| | | | |
|---|---|---|---|
| 4,803,634 A * | 2/1989 | Ohno et al. | 700/213 |
| 5,085,377 A | 2/1992 | Rohrer et al. | |
| 5,374,231 A | 12/1994 | Obrist | |
| 5,441,214 A * | 8/1995 | Kushihashi et al. | 242/552 |
| 6,117,242 A | 9/2000 | Kreiselmaier | |
| 6,138,938 A | 10/2000 | Lehrieder et al. | |
| 6,155,516 A | 12/2000 | Lehrieder et al. | |
| 6,591,153 B2 * | 7/2003 | Crampton et al. | 700/103 |
| 6,950,722 B2 * | 9/2005 | Mountz | 700/214 |

FOREIGN PATENT DOCUMENTS

DE   37 39 234 A1   5/1988

(Continued)

OTHER PUBLICATIONS

"Alles ist in Bewegung"; Von Roland Thumm, 83(1991)22 Februar, No. 8, Bern, CH.

(Continued)

Primary Examiner—Sean P Shechtman
(74) Attorney, Agent, or Firm—Jones, Tullar & Cooper, PC

(57) ABSTRACT

A processing machine, such as a printing press, is supplied with materials, such as rolls of paper, under the control of a control system. The control system is of a higher order than either of the material supply system and the processing machine. It is connected to both the supply system and the processing machine for transmitting data using signals.

16 Claims, 8 Drawing Sheets

FOREIGN PATENT DOCUMENTS

| | | |
|---|---|---|
| DE | 37 04 414 A1 | 8/1988 |
| DE | 39 10 444 A1 | 10/1990 |
| DE | 41 35 001 A1 | 6/1992 |
| DE | 42 17 473 A1 | 12/1992 |
| DE | 89 16 100.9 | 9/1993 |
| DE | 39 10 444 C2 | 10/1993 |
| DE | 89 16 104.1 | 10/1993 |
| DE | 43 39 234 A1 | 8/1994 |
| DE | 43 28 038 A1 | 2/1995 |
| DE | 44 16 213 A1 | 11/1995 |
| DE | 297 00 874 U1 | 8/1997 |
| DE | 196 37 770 A1 | 3/1998 |
| DE | 196 37 772 A1 | 3/1998 |
| DE | 198 03 497 A1 | 8/1999 |
| DE | 199 48 139 A1 | 4/2001 |
| EP | 0 390 735 A2 | 3/1990 |
| EP | 0 410 400 A2 | 1/1991 |
| EP | 0 491 657 A1 | 12/1991 |
| EP | 0 491 657 A1 | 6/1992 |
| EP | 1 160 189 A2 | 5/2001 |
| EP | 1 197 891 A1 | 4/2002 |
| GB | 2 351 160 A | 12/2000 |
| JP | 62073949 | 4/1987 |
| JP | 2000005981 | 1/2000 |
| JP | 2000514220 T | 10/2000 |
| JP | 20015121599 T | 8/2001 |
| JP | 2001306779 | 11/2001 |
| JP | 2001350512 | 12/2001 |
| JP | 2002091536 | 3/2002 |
| JP | 2002133556 | 5/2002 |
| JP | 2002144536 | 5/2002 |
| WO | WO 97/19758 | 6/1997 |
| WO | WO 98/36335 | 8/1998 |

OTHER PUBLICATIONS

D1, "Automatische Rollenversorgung bei MDS jetzt in Betrieb"; Andres; Sep. 2000.

D2, "MPS Production, Von der Einlastungsplanung bis zur Maschinenvoreinstellung von Zeitungsrotationen";ABB Schweiz AG.

D4; "MPS Roll handling, Wirtschaftliche, automatisierte Papierrollenversorgung durch Transport- und Logistiksysteme"; ABB Industrie AG; 2000.

D5; "MPS Press Control 760, WEllenlose Rotationsdruckmaschinen mit Einzelantrieben"; ABB Schweiz AG; 2002.

D6; "Open Press System"; No. 1, 2000; EAE Unternehmensgruppe.

D7; "OPS MaFlow"; EAE Unternehmensgruppe.

B. Butler, R. Koch, T. Flury, "Benutzerhandbuch MVS Materialfluss- und Verwaltungsystem (Materialfluss-Rechner fur Rollentransportsystem)." Swisslog AG (Aarau, Germany). AB-D1, (Dec. 6, 2002).

B. Butler, R. Koch, "Benutzerhandbuch MVS Materialfluss- under Verwaltungssystem (Materialfluss-Rechner fur Rollentransport-system)," Swisslog Software AG (Aarau, Germany), AB-D2, Apr. 22, 2002.

S. Doggwiler, C. Rothlisberger, "Project MediaPrint Wien MVS Materialfluss- und Verwaltungs-System (Materialfluss-Rechner fur Rollentransporsystem)," Swisslog Software AG (Aarau, Germany), AB-D3, Nov. 7, 2001.

Statusbericht IBS Media Print Wien, Swisslog Software; (May 8, 2002) AB-D4.

Robert Koch, Christian Rothlisberger, Thomas Trondle, "Testbericht IBS Media Print Wien," Swisslog Software, AB-D5, May 5, 2002.

Thomas Trondle, "Media Print 68817600, Wien," ABB Schweiz AG (Switzerland), AB-D6, May 7, 2002.

T. Trondle, "Project Mediaprint Wien. Rollenlogistik-System," ABB Schweiz AG, AB-D7, Jul. 2, 2002.

Robert Sturzenegger, "M. Dumont - Schauberg MVS Materialfluss- und Verwaltungs-System (Materialfluss-Rechner fur Rollentransportsystem),"Swisslog Digitron-OWL AG (Aarau, Germany), AB-D9, Sep. 16, 1998.

Philippe Meuli, "M. Dumont - Schauberg Materialfluss-und Verwaltungs-System MVS (Materialfluss-REchner fur Rollentransportsystem), " Swisslog Digitron-OWL AG (Aarau, Germany), AB-D10, Nov. 12, 1998.

Holger Stoewe, "MaFlow Systembeschreibung," EAE software GmbH (Komkamp, Germany), WF-D1, Jun. 19, 2001.

Corinna Fante, "MaFlow Applicazione," EAE software GmbH (Komkamp, Germany), WF-D2, Mar. 8, 2001.

EAE Software GmbH, "MaFlow 4 Anwendung," EAE software GmbH, WF-D3, Jan. 19, 2000.

OPS Print Napoli, OPS Plate Napoli, OPS Workflow Napoli, OPS MaFlow Napoli; EAE Software; May 21, 2001; WF-D4.

Spezifikation Rollenlogistik MediaPrint Wien; Swisslog Software AG; Nov. 7, 2001; SL-D2.

S. Doggwiler, C. Rothlisberger, "Projekt MediaPrint Wien MVS Materialfluss- und Verwaltungs-Systems (Materialfluss-Rechner fur Rollentransportsystem)." Swisslog Software AG (Aarau), SL-D3, Nov. 7, 2001.

B. Butler, R. Koch, "Benutzerhandbuch MVS Materialfluss- und Verwaltungssystem (Materialfluss-Rechner fur Rollentransportsystem)," Swisslof Software AG (Aarau, Germany),SL-D4, Apr. 22, 2002.

Robert Koch, Christian Rothlisberger, Thomas Trondle, "Testbericht IBS Media Print Wien," Swisslog Software, SL-D5, May 5, 2002.

Thomas Trondle, "Media Print 68817600, Wien," ABB Schweiz AG, SL-D6, May 7, 2002.

Statusbericht IBS Media Print Wien; Swisslog Software; May 8, 2002; SL-D7.

Thomas Trondle, "Project Mediaprint Wien. Rollenlogistick-System," ABB Schweiz AG, SL-D8, Jul. 2, 2002.

* cited by examiner

METHOD AND DEVICES FOR AUTOMATICALLY SUPPLYING MATERIAL TO A PROCESSING MACHINE

CROSS-REFERENCE TO RELATED APPLICATIONS

This U.S. patent application is the U.S. national phase, under 35 USC 371, of PCT/DE2003/002781, filed Aug. 21, 2003; published as WO 2004/031873 A2 and A3 on Apr. 15, 2004 and claiming priority to DE 102 45 658.5 filed Sep. 30, 2002, the disclosures of which are expressly incorporated herein by reference.

FIELD OF THE INVENTION

The present invention is directed to a method and to devices for the automatic supply of material to a processing machine, and in particular to the supply of a printing press with rolls, as well as to a control system and to a print shop with a control system 25, 44 or 46. The control system includes a planning level and a coordination level.

BACKGROUND OF THE INVENTION

An automatic installation for inserting rolls into roll supports of a printing press is known from DE 39 10 444 C2. Logistics, with respect to the rolls, are provided by a control system assigned to this installation.

A method and a device for handling paper rolls is known from DE 43 39 234 A1. The rolls are managed by a control system of a storage device and are conveyed by a roll transport system. In response to a request for a fresh paper roll by a printer, data regarding size and quality input by the printer are provided to the control system and to the transport carriage.

DE 44 16 213 A1 discloses an installation for storing and for placing paper rolls. A central control computer of the roll supply installation receives data regarding paper rolls from a data acquisition device and is in contact with a control console computer and/or with a higher-order computer of a work preparation unit.

DE 43 28 036 A1 shows a device or a method for material supply, with a storage and a transport system, in which the transport system is controlled from a central computer. The central computer is in contact with a control console computer and, if required, is also in contact with a central logistic computer, which controls the operations of all of the printing presses of the print shop. Monitoring of the stock of rolls in storage also takes place.

DE 199 47 139 A1 shows a straight control system which determines a fill level of workpiece storage devices. In addition, the system possibly receives an acknowledgement regarding the operational readiness of individual machines, which it takes into consideration.

In DE 198 03 497 A1 fill levels, in this case of plastic materials in containers, are monitored with respect to a predetermined minimum fill level. Furthermore, allocation combinations are stored in a central control system which decides which material is processed in which machine. Valves in appropriate supply lines are controlled by the central control system.

SUMMARY OF THE INVENTION

The object of the present invention is directed to providing a method and devices for the automatic material supply of a processing machine, as well as a control system, and a print shop with a control system.

In accordance with the present invention, this object is attained by the provision of a method and apparatus for use in the supply of materials, such as rolls of paper, to a processing machine, such as a printing press. The material supply is controlled by a system that has a planning level and a coordination level. A planning strategy is developed on the planning level and a flow control of at least one subsystem of the material supply system is performed on the coordination level. Actual product data and production-relevant planning data are sent to the control system.

The advantages to be gained by the use of the present invention consist, in particular, in that a production is possible which is free of errors to a large extent. Errors, as well as delivery delays because of human failure and wrong decisions, have, in particular, been excluded to a large degree. Furthermore, the available supply of paper rolls, in particular, also the supply of rolls which have previously been started, can be used as economically as possible in the production. Furthermore, savings in personnel can also be achieved by use of the method and devices of the present invention.

Moreover, the size of an associated storage facility can be minimized, and the ordering process for supplies can be automated. In a further development in accordance with the present invention, the logistics system is in contact with a production planning system in such a way that it is possible, in an early phase, to detect possible deficits in the stock at hand. The production can either be changed or a delivery can be arranged as fast as possible.

In contrast to prior solutions, where, for example, requests for estimates of a need for rolls come from the printer, the concept, in accordance with the present invention, assures the highest degree of dependability, flexibility and effectiveness. The data already existing for other purposes, such as, for example, for product planning or for planning the configuration of the printing press, and which data is stored in the appropriate data processing unit, are made accessible to an otherwise independent control system. This control system has been structured with its own "intelligence" and it conceptualizes the roll logistics, on the basis of the received data. The access of the control system to actually existing data further increases the dependability and flexibility of the method in accordance with the present invention.

BRIEF DESCRIPTION OF THE DRAWINGS

Preferred embodiments of the present invention are represented in the drawings and will be described in greater detail in what follows.

Shown are in.

DESCRIPTION OF THE PREFERRED EMBODIMENTS

Figure 1:
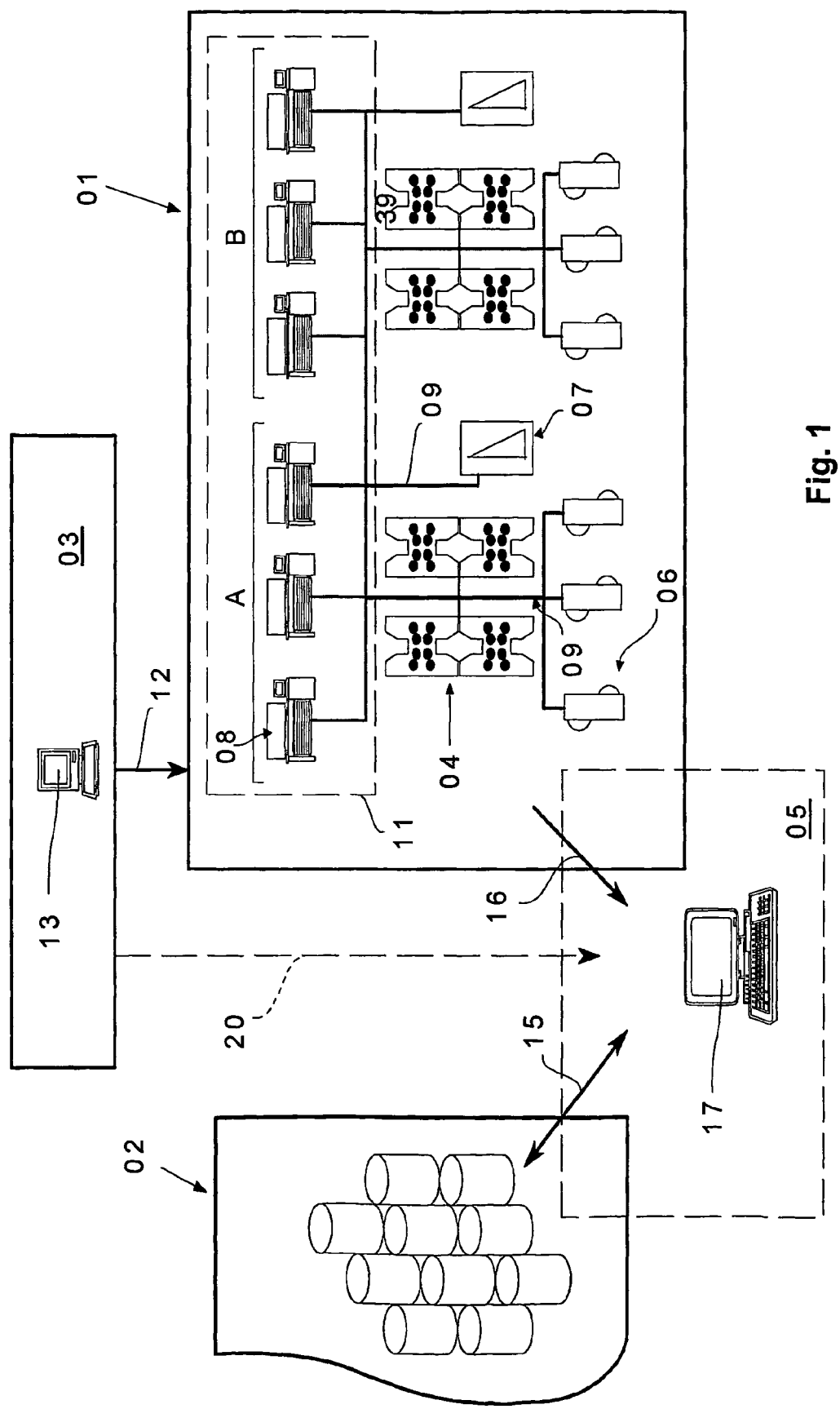
FIG. 1, a schematic representation of a print shop with a printing press and with a roll supply system, in FIG. 2, a schematic representation of a possible path of a roll through the roll supply system, in FIG. 3, a process-related representation of the roll supply, in FIG. 4, a data flow-related representation of the roll supply, in FIG. 5, a first preferred embodiment for the physical connection of the material flow system, in FIG. 6, a second preferred embodiment for the physical connection of the material flow system, in FIG. 7, a third preferred embodiment for the physical connection of the material flow system, and in FIG. 8, a fourth preferred embodiment for the physical connection of the material flow system.

A business, whose purpose is directed to the processing or treating of webs, such as, for example, a print shop in accordance with the depiction of FIG. 1, has, for example, at least one processing machine 01 which processes and/or treats webs such as, for example, a printing press 01. The business depicted schematically in FIG. 1 also may include a material supply system 02, such as, for example, a roll supply system 02, as well as a product planning system 03, if required. Moreover, this business or installation has a control system 05 configured as a material flow system 05 for coordinating and for assuring the supply of rolls to the production process.

The printing press 01 has at least one unit 04, which is embodied as a printing unit 04 and/or as a printing tower 04, for use in imprinting a web. The at least one printing unit 04 is supplied with material, such as, for example, paper, by at least one unit 06, which may be embodied as a roll changer 06, such as a roll changer 06 for a stopped press or a roll changer 06 for roll changing at full press speed. The printing press 01 can furthermore contain a unit 07, which is located downstream of the printing unit 04, and which is used for processing the imprinted web. This downstream unit 07 may be, for example, at least one folding apparatus 07. The at least one printing unit 04, the at least one roll changer 06, and possibly the at least one folding apparatus 07 are connected via at least one signal line 09, such as, for example, by an internal printing press network 09, with at least one operating and computing unit 08, which may be, for example, a control console with a PC.

As a rule, several, for example, five or even more roll changers 06 are employed, together with a folding apparatus 07, for a production process. This combination, together with the associated printing units 04, or printing towers 04, is called a section A, B. A line of presses consists, for example, of several sections A, B, on each of which sections different production processes can be performed.

In the configuration represented in FIG. 1, the printing press 01 has, by way of example, two sections A, B, each section A, B being configured with two printing towers 04, with three roll changers 06, with three operating and computing units 08, as well as with one folding apparatus 07. In the embodiment in accordance with FIG. 1, the roll changers 06, as well as the printing units 04 of each section, are connected with each other via the network 09. A connection exists between the sections A, B and/or between the operating and computing units 08 via the network 09, which connection may be homogeneous or heterogeneous. The folding apparatus 07, if provided in each section, are also in connection with this network 09.

The operating and computing units 08, together with their transverse connection, as well as with further, not specifically represented, computing and data processing units, form a so-called management level 11, or a press management level 11 of the printing press 01. This press management level 11 has, for example, a signal connection 12 with, for example, at least one computing and/or data processing unit 13 of the product planning system 03. At least product-relevant data are transmitted, via this signal connection 12, from the product planning system 03 to the printing press 01 or web processing machine.

In a suitable manner, the printing press or web processing machine 01 is in a signal connection 15, 16 with the roll supply system 02, for example via the material flow system 05. Production-relevant data is transmitted from the printing press 01 to the material flow system 05, to, for example, at least one computing and/or data processing unit 17 in the material flow system 05, at least via the signal connection 16 between the printing press 01 and the material flow system 05. In addition or alternatively, a transfer of data to the material flow system 05 can also take place via an optional signal connection 20 from the product planning system 03. In principle, the material flow system 05 can also be assigned to the roll supply system 02 or to the printing press 01 or, in an advantageous embodiment of the present invention, can be of a higher order with respect to these two, within the framework of its tasks.

Figure 2:
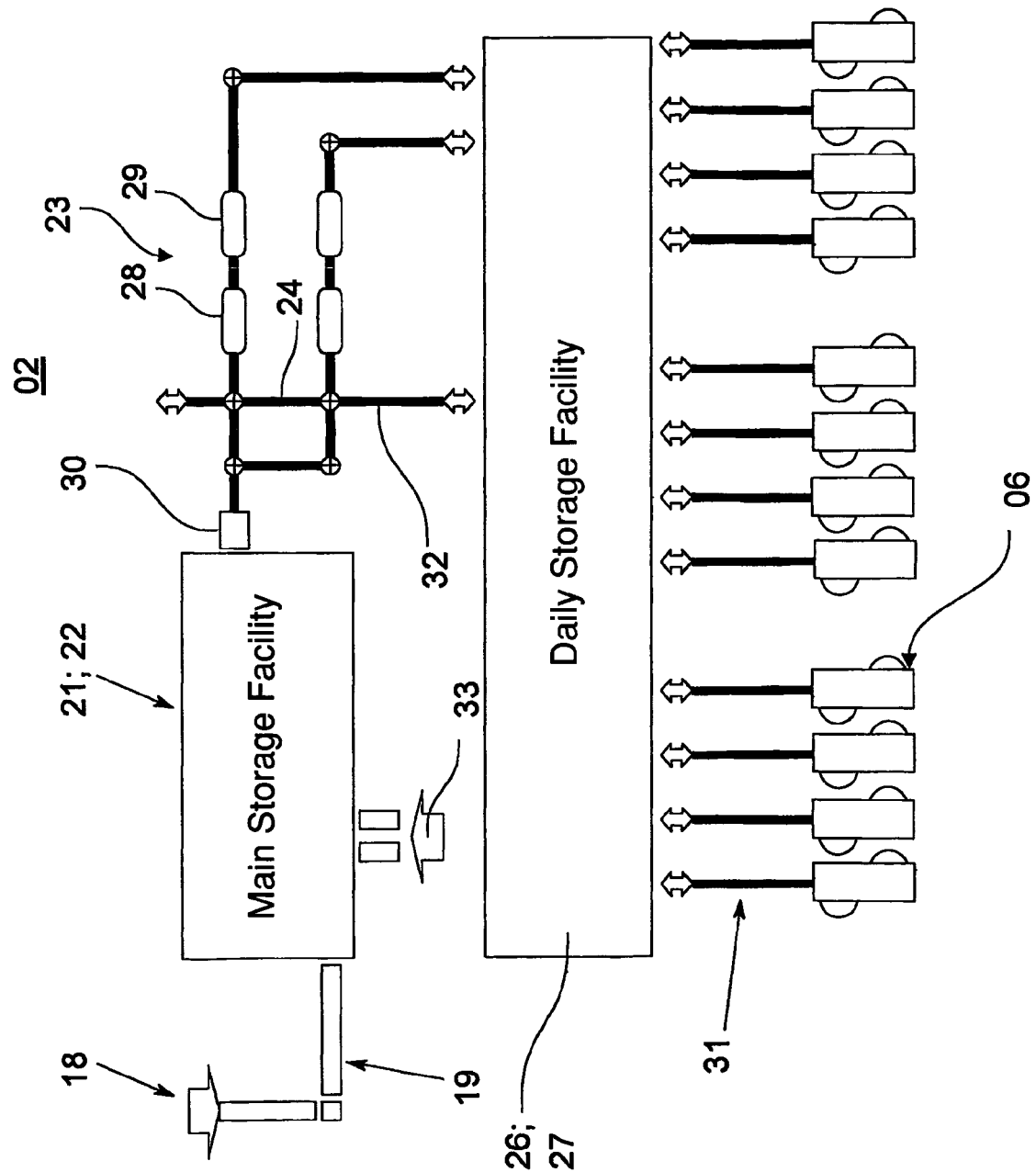

A possible configuration, based on hardware technology, of a roll supply system 02, in accordance with the present invention, is schematically represented in FIG. 2. However, in a device in accordance with the present invention and/or for practicing the method in accordance with the present invention, not all of the sub-systems described hereinafter, for the roll supply system 02, need be provided. The individual functional sub-systems can also be embodied in a way which may be different from the one shown and described in connection with FIG. 2.

In the preferred embodiment, in accordance with FIG. 2, the roll supply system 02 has, as sub-systems 18, 19, 21, 22, 23, 24, 26, 27, 28, 29, 30, a material receiving device 18, a first transport system 19, a first storage facility 21, which may possibly be provided with its own transport system 22, such as a shelf-servicing device, crane or automatic guided vehicle or AGV, such as, for example, a main storage facility 21, a preparation circuit 23 with at least one transport system 24, a second storage facility 26, such as, for example, a daily or a production storage facility 26, also possibly with a transport system 27, such as a shelf-servicing device, crane or automatic guided vehicle or AGV, as well as a transport system 31 between the daily storage facility 26 and the roll changers 06 of the printing press 01. In addition, a so-called up-ending station 30, for use in up-ending of rolls delivered and/or stored in an upright position, into a position required for production, can be provided. The transport system 31 of the roll supply system 02 is embodied, for example, as an inner loading circuit 31, which is to be assigned to the printing press 01 or to the roll changer 06. The preparation circuit 23 has, for example, at least one unpacking station 28, as well as a gluing preparation device 29. Transport paths 32, 33 for the return transport of empty rolls or their reels, and/or pallets can optionally be provided, as depicted in FIG. 2.

As a minimum requirement, the roll supply system 02 can also have only one of the storage facilities 21, 26 with its associated transport system 22, 27. It will also have the transport system 31 between the storage facility 21, 26 and the roll changers 06 of the printing press 01.

In the simplest case, the material receiving device 18 consists of a delivery position to the automatic roll supply device and of an input possibility, or location, for the roll entry information. However, it is advantageous, in an optional manner, to perform unloading of supply rolls from a truck, train or ship not by the use of a forklift, but to automate such unloading. Here, three basically different models or modes of unloading can be distinguished. The first is a prone transport of the paper rolls and rolling of the rolls via the roll's circumference. Second an upright transport of the rolls on a truck/railroad car/ship with rails on the bottom. Third an upright transport of the paper rolls on a special truck/railroad car/ship which has a sort of conveyor belt on the loading surface.

A roll separating device can be assigned to the material receiving device 18. As a rule, rolls of either half or of quarter width are transported upright on top of each other. In this case, it is necessary to initially separate the rolls, for example to lift off the upper roll and to place it at the side of the lower one.

Damage can possibly occur in an automatic system if the material to be transported does not correspond to the expected shape of the material. It is therefore practical to check to insure that the outer shape of the roll is kept within defined tolerances and to additionally assign a contour control device to the material receiving device 18. In connection with paper rolls, systems with photoelectric barriers, photoelectric grids or surface scanners can be considered, for such use to which systems a more or less intelligent evaluating device is connected.

It is furthermore advantageous if the delivered roll is identified, in the area of the material receiving device 18, for example by detecting a bar code or by the use of another identification system. The bar code strip is used for identification of the roll and is detected by the identification portion of the system.

For the upright storage of packaged paper rolls, for example, the first or main storage facility 21 is embodied as an elevated shelf storage device 21 with several storage compartments arranged in several blocks and on several levels. The elevated shelf storage device 21 can also be able to receive pallets. It should be of a capacity sufficient for being able to receive the amount of paper rolls which will be required for up to eight weeks. If, for example, the rolls are stored upright in the main storage facility 21, the up-ending station 30, for example, adjoins the main storage facility 21, and receives each roll before the roll gets into the preparation circuit 23.

As a rule, a preparation circuit 23 consists of an unpacking station 28 and a gluing preparation device 29, which is typically embodied as an automatic gluing preparation device. Added to this are transfer positions for the respective transport system 24. For example, the unpacking station 28 has facilities on which the paper rolls can be aligned and can be unpacked semi-automatically. Furthermore, the bar code on each roll can be detected, for example by the use of a hand scanner, for checking, for example, the diameter to be determined and the roll can we weighed for a check. The gluing preparation device 29 represents, for example, an automatic gluing preparation system. A suitable gluing preparation device 29 can prepare approximately 15 rolls in an hour, for example.

The daily storage device 26 is used for receiving paper rolls which have been prepared for production in the preparation circuit 23 or which have been returned from the roll changers 06. It should be noted that the glue preparation of each roll lasts only for a limited time, at present typically 8 to 12 hours, for example, and must then be renewed. It is possible that roll remnants on loading aids, which were returned from a roll changer 06, as well as loading aids themselves must be handled in the daily storage device 26.

A roll changer 06 has, for example, two pairs of support arms for receiving paper rolls. A portion of a conveying track is assigned to each roll changer 06, on which conveying track a paper roll can be presented to the roll changer 06. The roll changer 06, with its buffer position, or receiving space is also called an inner loading circuit 31 and is a part of the printing press 01, or is assigned to it. It is used for rolling off the paper rolls and for automatic roll change with gluing.

As previously discussed above, as a rule there are several different transport systems 19, 22, 24, 27, 31 for transporting the paper rolls. If the roll is stored in an upright position, in one or in several storage areas, or if the rolls are delivered upright, an up-ending station, such as the one schematically not represented at 30, can also be required. For transport over extended horizontal distances such as, for example, between the material receiving device 18 and the main or first storage facility 21, belt or plate conveyors are employed, for example, which function similarly to a conveyor belt. In a main or first storage facility 21 embodied, for example, as an elevated shelf storage device 21, shelf-servicing devices 22 are employed as transport systems 22. For storage facilities 21, 26 of up to three levels, and embodied as shelf-storage facilities 21, 26, and for distance transporting, transport systems 19, 22, 24, 27, which may be embodied, for example, as driverless floor conveying devices 19, 22, 24, 27, can also be employed. Track-bound transport systems 24, 31, such as, for example, driven track-bound transport carriages with appropriate guide devices, for example, are employed for accomplishing roll transport within the preparation circuits 23 and in the inner loading circuits 31. In small to medium-sized installations the entire roll transport can be provided by the use of track-bound transport carriages.

The movement control of each of the transport systems 19, 22, 24, 27, 31 is provided by a control device 34, 35, such as, for example, a memory-programmable control device 34, 35, and in particular a configurating SPS, including operating panel, by the use of which transport orders can be configured, which control device 34, 35 is assigned to this transport system 19, 22, 24, 27. In an advantageous embodiment, a computer unit 34, 35 can be assigned to this transport system 19, 22, 24, 27, 31, and can be configured, for example, as a vehicle guidance computer 34, 35. See FIG. 3 in this connection. The control device 35 of the inner loading circuit 31 and/or of the roll changer 06 represents, for example, an interface between the roll supply system 02 and the printing press 01, which can be assigned to one or the other system, depending on the considerations and embodiment.

In a high-performance printing press with, for example, cylinders of double circumference, i.e. with a circumference of 900 to 1300 mm which circumference, depending on the print format, corresponds to two section lengths, for example two heights of a newspaper page, approximately 90,000 pieces are produced per hour, for example, during double production, and approximately 45,000 pieces are produced during collect-run production. If approximately 18,000 m of paper are rolled up on a roll, a roll will be used up, for example, in approximately 15 to 20 minutes. Approximately 4 to 7 min must be set aside for roll change, roll acceleration, gluing and reel ejection.

The roll supply system 02 must be capable of supplying a printing press 01, with one or with several lines of presses, each of which consists of several sections A, B, with a sufficient number of prepared paper rolls. Thus, for example, there can be a requirement for the supplying of approximately 60 rolls per hour during the production times, which is at night, as a rule. Filling the daily storage facility 26 and preparing the rolls can take place, for example, during times of low production, for example, during the day.

The roll supply system 02 must furthermore be able to meet roll orders and to receive return orders from roll changers 06. It is also desirable to determine the actual paper requirements by the use of production data provided by the production planning system 03, for example also on the basis of actual press parameters actually provided by the press management level 11. Moreover, "desired" production data should be taken into consideration during the running production.

For meeting the above-mentioned requirements, the print shop has the material flow system 05 for use in planning, coordinating and controlling the material flow in the print shop. In an advantageous embodiment of the present invention, the material flow system 05 controls and maintains the entire flow of material in the entire installation and is of a higher order than are the sub-systems of the roll supply system 02. Besides the direct roll supply, the material from system 05 contains, for example, the handling of the material receiving device 18 and the maintenance of the first and second storage facilities 21, 26. If either storage facility 21, 26 is configured with its own storage maintenance system, in the form of a sub-system, the material flow system 05 has at least one interface with this sub-system.

Figure 3:
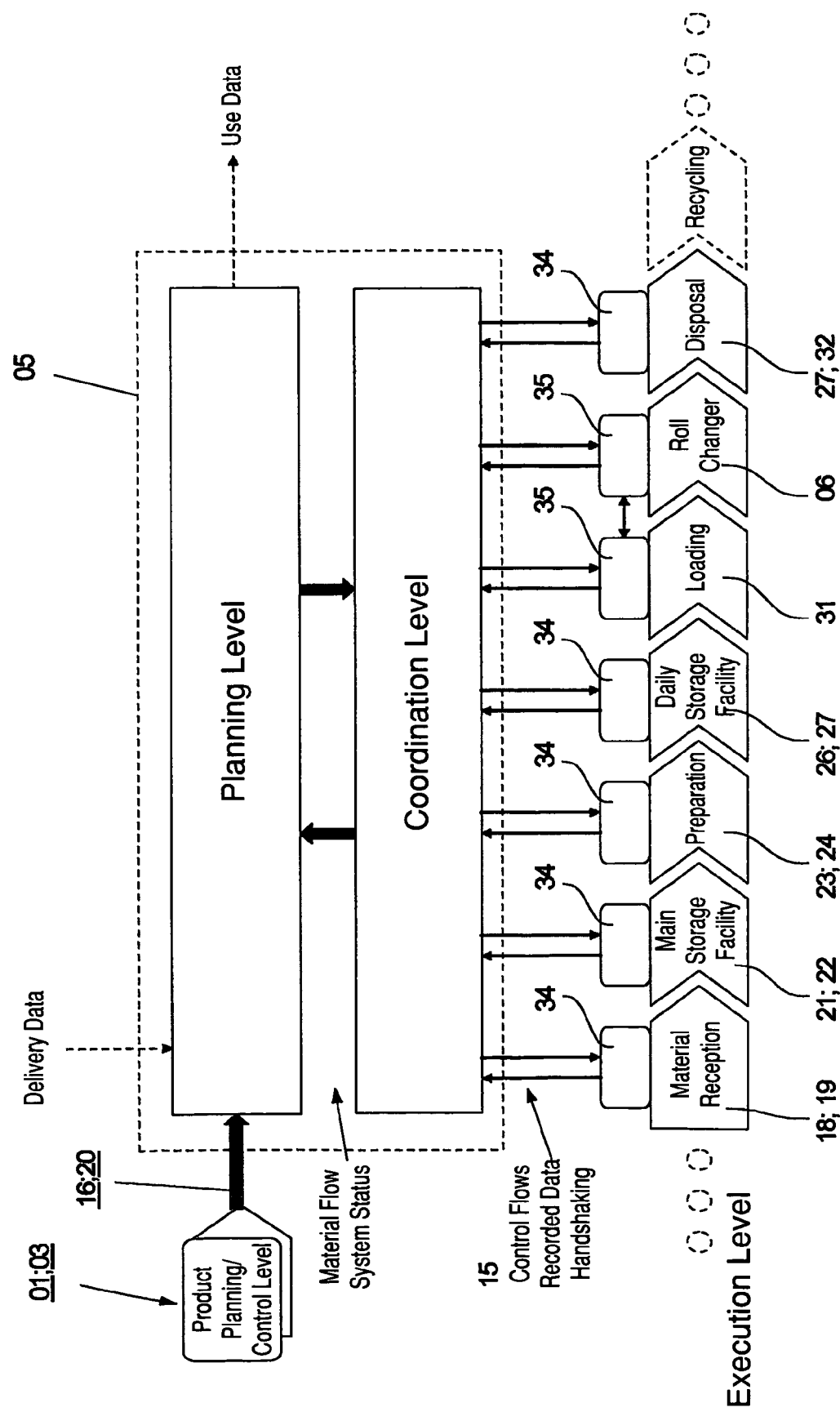

The material flow system 05 is shown by dashed lines in FIG. 3. The material flow system 05 receives information regarding planned and running productions from the higher-level product planning system 03, for example via the signal connection 16, or from the printing press 01, and, in particular, from the management level 11 of the printing press 01. These data are processed in the material flow system 05 in a manner which will be explained in greater detail below. The previously mentioned, lower-order sub-systems of the roll supply system 02, or of the printing press 01, each of which performs strictly limited functions, are available inter alia to the material flow system 05 for accomplishing the material transport, the roll preparation and for supplying the press. For this purpose, the material flow system 05 has a signal connection 15 to the sub-systems required for the flow of materials. In the simplest case of the roll supply systems 02, these systems can merely be one of the first or second storage facilities 21, 26, possibly with the transport systems 22, 27 and the transport system 31 from the storage facility 21, 26 to the roll changer 06. However, the material flow system 05 has been represented as a process chain together with all of the above mentioned sub-systems, as depicted in FIG. 3.

Viewed in respect to the process, two different process levels 38, 39 of the material flow system 05 itself are shown, namely a planning level 38 and a coordination level 39, which work together with a third process level 41, the execution level 41, which is constituted by the sub-systems.

The planning level 38 is responsible for calculating consumption, for storage and supply strategy in relation with the planned production, for monitoring functions, and for the storage and supply management. This planning level 38 has interfaces with the coordination level 39 and, if required, also with non-system data sources, such as for receiving electronic delivery data or delivery documents from suppliers, for example and data sinks, such as the delivery of use data to a data bank, for example. The planning level 38 can start with its work before the coordination level 39, or the sub-systems of the execution level 41, are ready to operate or are still handling other orders. It could be a situation that continuously re-occurring productions, such as, for example, a defined newspaper or magazine, are already planned weeks and months ahead of time. Since the planning level 38 has data regarding the stock available, a decision is made at the planning level, when the need occurs, whether and which replacement roll is to be used in place of the non-availability a required roll.

The coordination level 39 is responsible for the run-off control, for transport control, for movement control, for safety monitoring and for storage place management. Strategies are employed here for optimizing the resources for the transport and the cycle times. The coordination level 39 receives information from the planning level 38 regarding where, and in which time window, which paper, or which roll, is required, and coordinates the lower-order sub-systems of the execution level 41 to assure the supply of the production under the conditions of the framework mentioned. As a rule, the time window to which the work of the coordination level 39 relates includes a night or a production day. However, in some cases this time window can be expanded to as much as a week.

The execution level 41, as the third process level 41, consists of a number of the above-mentioned, self-sufficient sub-systems, each of which perform strictly limited functions. As a rule, these sub-systems each consist of a mechanical device and the control 34, 35, with which the coordination level 39 has an interface. In most cases, the sub-systems of the execution level 41 do not communicate directly with each other, but instead communicate via the coordination level 39. On the execution level 41, each sub-system only sees its actual mission. After this mission has been performed, the next mission can be forwarded to the specific sub-system from the coordination level 39. Depending on the sub-system, these missions can be of different complexity. Exceptions to the exclusive interface if a sub-system with the coordination level 39 only exist, for example, in connection with hardware contacts for safety, or back-up operations, as well as in the inner loading circuit 31 which, for example, is embodied as a branch channel with carriages extending from the transport system 27 and which acts together with a sliding platform, which is not specifically represented, and the support arms of the roll changer 06. In the last mentioned sub-system, automatic movements change into each other, wherein the function for supplying the printing press 01 must also be assured, even when the higher-order systems, such as the material flow system 06 or a part thereof, for example, have failed. Therefore, the roll changer 06 must be in operative connection with the control of the printing press 01, as well as with the roll supply system 02.

Since the various process levels 38, 39, 41 can operate independently of each other to a large extent, and thus are semi-autonomous, it is advantageous to provide a required exchange of data on the process level 38, 39, 41, where the data are needed. It is important for the fail-safe operation and for the availability of the entire installation, in particular, that information is actually being handled at the place where it is processed. Besides this, it is also of particular advantage that no unnecessary data traffic takes place over the connections between the individual process levels 38, 39, 41 which data traffic, for example, would relate to the regulating or to the control process of the individual sub-system itself. Each system or sub-system receives its orders, processes them and reports back in accordance with the interim result.

The planning and the coordination levels 38, 39 can be configured as separate processes on a common computing and/or data processing unit 17, such as, for example, a server 17, or on two servers 17 connected with each other. However, the sub-systems of the execution level 41 are each individually embodied and can be provided as different models from different suppliers, in the same way as the systems of the printing press 01.

In an advantageous embodiment of the present invention, a framework of conditions for the data to be exchanged has been determined for communication between the printing press 01, or the managing level 01 and/or the product planning system 03 with the material flow system 05, and, in particular, between the material flow system 05 and the associated sub-systems.

Figure 4:
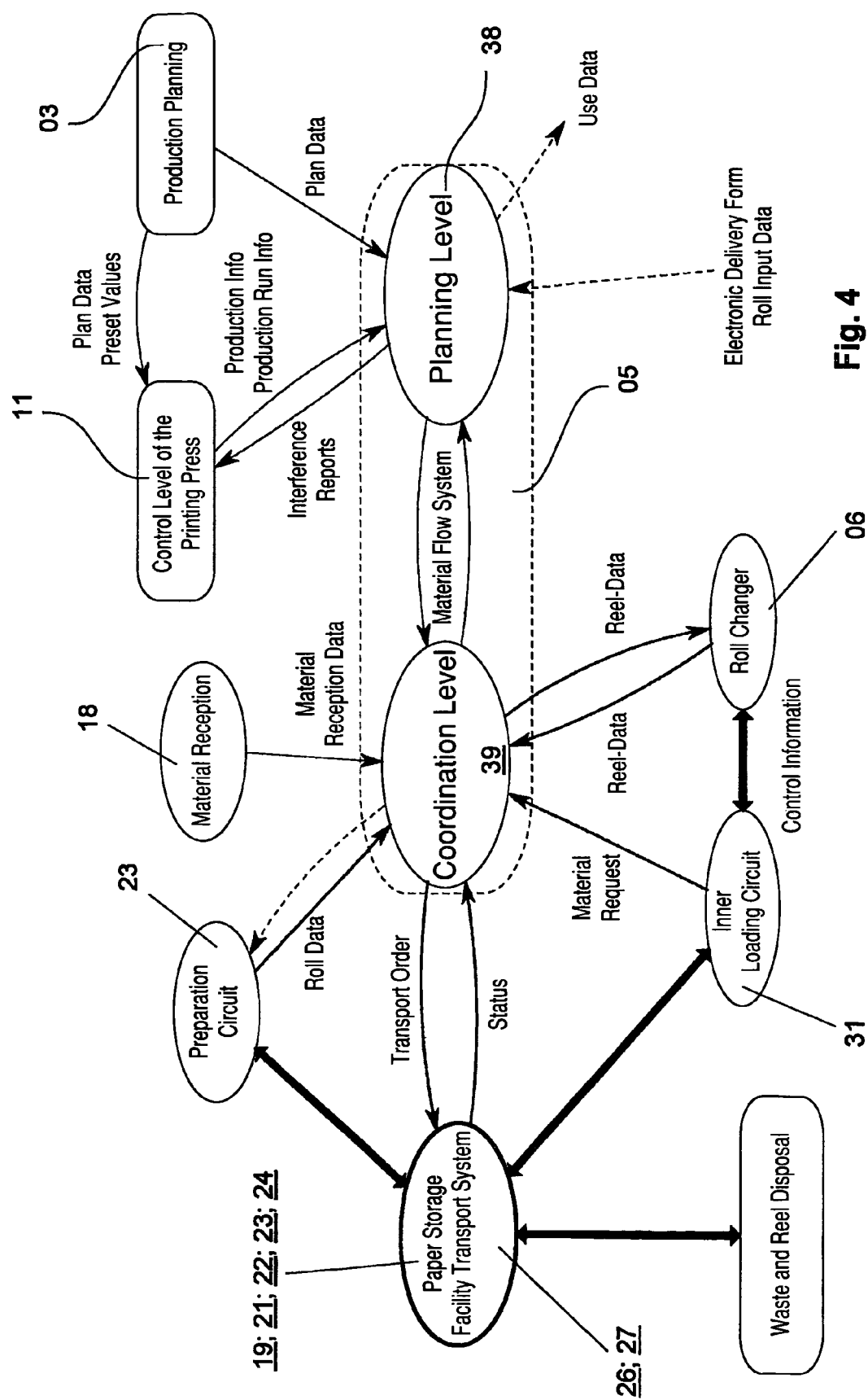

The functional units, as well as the data flows, which are required for automatic roll supply, are represented in FIG. 4. Although, for this representation, the roll storage facilities 21, 26, as well as the transport systems 19, 22, 24, 27, have been combined as functional units, they communicate substantially individually as functional units with the communications level 39, as described above. Although the order, if given, and the acknowledgement of the preparation circuit 23, if provided, can also take place over this path, the preparation circuit 23 is again explicitly shown as a functional unit, from which the coordination level 39 receives roll data, for example. The same applies to the material receiving device 18, if provided in respect to material reception data, as well as to the inner loading circuit 31 with respect to a request for material. As a further functional unit, the roll changer 06 exchanges data with the coordination level 39, for example with respect to actual rolls or with respect to those to be requested or to be returned, and is additionally connected, as already explained above, with the inner loading circuit 31 with respect to data.

Not all of the data flows represented in FIG. 4 are absolutely necessary for the basic functionalities of the roll supply system 02 or of the material flow system 05. However, the intentions are to automate the paper supply, as a whole, and to integrate it into a computer-supported work flow.

The most important data sources and data sinks are the management level 11, from which the actual production data, such as press rpm, desired circulation, actual circulation, etc., are received; the product planning system 03, which supplies the product layout, the type of paper, the roll widths, the roll supports involved and the planned production date; and the roll changers 06 or the sliding platforms of the inner loading circuit 31, by the use of which the production is realized.

Here, the data flows merely show the logical path of the data. Control flows and the physical transfer medium cannot be seen in this representation. Data flows which are without importance here for the flow of material, for example between the roll changer 06 and the press management level 11, are not shown. Since this relates to the data interfaces of the material flow system 06 with the "outside", the internal data flows between the planning level 38 and the coordination level 39 are not examined in detail.

In a manner the same as that discussed with the previous process chain in FIG. 3, the communication with external systems, such as the press management level 11, the product planning system 03, the exporting of user data, the importing of delivery or roll input data, thus takes place via the planning level 38, while the data exchange with the lower-order subsystems is performed via the coordination level 39.

In what follows, the essential data to be transferred via the above-mentioned data interfaces will be defined.

In the case where the total system has an appropriately equipped material receiving device 18, the information regarding an arrival of a roll is provided by the material receiving device 18 with at least standardized information regarding the geometry of the roll, as well as regarding the quality of the paper. This information from the manufacturer is preferably contained in a bar code assigned to the roll, for example in Ifra, Cepi or Tappicode.

By using the Ifra-code, data regarding the roll number, such as the paper machine number and production week, as well as roll ID or the reel number with the corresponding reel set and position in the reel, the gross weight of the roll, type of packaging, manufacturer, paper type, basis weight and quality in the form of a code, as well as the manufacturer's code, for example, are transmitted. By using the Tappi code, the manufacturer's code, manufacturer's location, paper machine, year of manufacture, month of manufacture, day of manufacture, reel of the day, radial position of the paper on the reel, as well as the horizontal position of the paper on the reel, for example, are transmitted.

In addition to the data supplied by the manufacturer by the bar code, parameters detected in the area of the material receiving device, such as "roll width", as well as "roll status", for example, type and depth of damage, can be transmitted.

In a situation where the installation either does not have a material receiving device 18 configured in this way, or where, in addition to the data received from the material receiving device 18, the above mentioned data from the bar code can also be read out in the preparation circuit 23 and can be supplied to the material management system 05. In addition, data regarding, for example, the gross weight of the rolls, the gross weight of the white waste, the net weight of the rolls, the roll width, as well as the roll diameter are determined at the material receiving device 18 and are passed on to the material management system 05.

Important data relating to the roll, such as, in particular, its length, or a remaining length in case of returns, and its roll width, as well as the paper type, or roll IDs containing equivalent information, or bar code information and status information, are exchanged between the roll changer 06 and the material management system 05. Additional advantageous information relates to, for example, the winding direction, the roll diameter, its weight and its basis weight. Further data specific to the supplier, such as information regarding the geometry, the weight, supplier identification, IFRA code, the material number and the batch number, for example, can be exchanged. The data composed of some or all of the mentioned information are combined here and, as depicted in FIG. 4, under the category "reel data", for short.

The material flow system 05 receives the plan data required for planning of the material flow for pending, and for possibly running productions, from the production planning system 03. This plan data includes, beside a product recognition, for example, a product ID, the information essential for determining the requirements, the time windows and the user locations, such as the planned number of copies, for example, the planned time for a proof copy, the planned imprinting time, as well as the planned type of production. Information regarding the number of planned webs, with corresponding information regarding the paper, such as width, or assigned roll changer, as well as the total number of pages, the product name, the planned publication date, as well as the name of the issue, can be advantageously added to this plan data.

If no suitable interface between the product planning system 03 and the material flow system 05 has been provided, the above-described data can also be sent by the product planning system 03 to the material flow system 05 via the management level 11 of the printing press 01.

The material flow system 05 receives data from the management level 11 regarding the production itself, the actual status of the running production, as well as the geometry and the type of paper, and their relation with the roll changers. In addition, information regarding the product itself, such as the production ID, product name, publication date, name of the issue and number of copies, can be transmitted to the material flow system 05.

The data regarding the production can be sector identification, type of production, time for a proof copy, imprinting time and production status. For example, the actual status contains information regarding the intended number of copies, the number of printed products, the number of products suitable for sale, the status of the printing press, the production speed, as well as a time stamp.

Information regarding the type of paper consists, for example, of a paper identifier, of the basis weight and possibly the paper thickness. The relation between the paper and the roll changers 06 includes, for example, the identification of the roll changer 06, the assignment of the paper, such as, for example, a paper ID and information regarding the width of the paper.

The material flow system 05 can transmit outage reports. For example, it can transmit information regarding failed portions of the installation, and information for pin-pointing the error, to the management level 11.

As explained above, the material flow system 05 communicates, in the area of its coordination level 39, with the transport systems 19, 22, 24, 27, 31, or with the storage facilities 21, 26. This communication takes place in a similar way for the individual sub-systems previously mentioned and is treated here as a whole. The material flow system 05 directly addresses the respective transport systems 19, 22, 24, 27, 31, or the storage facilities 21, 26 and transmits a bring- or-fetch order. Since, in an advantageous manner, the material flow system 05 also includes the management of the storage spaces, in particular in the area of its coordination level 39, information regarding the starting point and the point of destination are transmitted to the respective transport system 22, 27. Although, in an advantageous embodiment, the storage facilities 21, 26 and/or the transport system 22, 27 do not have a storage space management device, they have a space monitoring device, such as a device for monitoring whether a space, and possibly which one, is free or is occupied. If the storage space management device is embodied as an individual sub-system between the storage facilities 21, 26 and the material flow system 05, the placing of a secondary order to the latter is necessary which placement, however, would entail an increased outlay for communications.

Each of the above-mentioned transport systems 19, 22, 24, 27, 31, or the storage facilities 21, 26 confirms its status to the material flow system 05, either in fixed cycles or, at the latest, after the termination or failure of the order.

To complete the picture, the transfer from the product planning system 03 to the management level 11 will also be mentioned. In addition to plan data already mentioned within the framework of the transmission from the product planning system 03 to the material flow system 05, this transfer contains all of the data essential for the configuration and presetting, such as color preset, web tension preset, sections, print locations, occupation, etc.

The data for the respective data interfaces, which must be transmitted without fail, are combined in the following table:

| | |
|---|---|
| Material receiving device 18 → MFS 05 | Roll ID Roll width Data from Ifra code, in particular weight |
| Preparation circuit 23 → MFS | Roll ID Net weight |
| Roll changer (RC) 06 → MFS (transport-relevant data and/or data relating to the status of the roll changer) | Status of the RC position Roll ID Actual diameter of the active roll Requesting a roll |
| MFS → roll changer (RC) 06 | Roll ID |
| Product planning system 03 → MFS (production-relevant data, planing data) | Planned roll changer 06 Planned or desired issue Size of the product (number of pages) Planned type of paper |
| Management level 11 → MFS (production-relevant data, data relating to the actual status) | Production speed Actual net issue, actual gross issue Desired issue |
| Transport system/storage facility → MFS | Status of the transport system/storage facility Roll ID |
| MFS → subsystem (transport system/storage facility) | Order or transport order |

An important aspect of the above-mentioned processes and data flows therefore is that a product-related data set, which characterizes the planned or the running product and which is stored in the computing and/or in the memory unit 13, or in the management level 11, is supplied via the fixed signal connection 16, 20, etc., to the material flow system 05 for further processing. It is neither necessary for the printer to manually provide a usage prognosis, nor is such a usage prognosis prepared in the area of the product planning system 03. In contrast hereto, the material flow system 05 always accesses actually present data for developing and/or for changing its decisions or strategy. The transfer of all of the above-mentioned tasks to the material flow system 05, which operates at a higher order with respect to the roll supply, and the access to data from the product planning system and/or from the printing press 01, assures the highest amount of flexibility and dependability. The material flow system 05 is always in an actual state regarding the production requirements, the supply, as well as the status of its lower-order subsystems and the interface with the roll changer 06.

For example, the following actions are to be performed with the above described configuration of the material or roll supply system 02 and the corresponding data exchange:
- unloading a truck, together with the material receiving control and storage in the main storage facility 21,
- repositioning in the main storage facility 21,
- removal from an elevated shelf storage device 21 to an up-ending station 30 and up-ending a paper roll,
- transporting a paper roll to an unpacking station 28,
- passing a paper roll to a removal point between the daily storage facility 26 and the inner loading circuit 31, or directly to a roll changer 06,
- storing a paper roll in the daily storage facility 26,
- repositioning a paper roll in the daily storage facility 26,
- monitoring the stability of the gluing preparation 29 in the daily storage facility 26,
- removal of a roll for repeating the gluing preparation 29,
- delivery of a paper roll to a transfer point of a roll changer 06,
- delivering a load assistance device or adapter to a roll changer 06 for receiving a roll remainder,
- return of paper rolls from the roll changer 06, with or without an adapter,
- transporting a container of a remaining reel from and to the roll changers 06,
- calculation and monitoring the paper requirements of the production with the aid of production data from the press management level 11,
- managing the storage space occupation and the stored supplies in the daily storage facility 26 and in the main storage facility 21,
- statistical evaluations and inventory,
- process visualization,
- acknowledgement of receipt of goods in electronic form (electronic delivery receipt),
- management of a possibly provided stacked layer storage/ additional block storage,
- default filling the daily storage facility 26 on the basis of empirical values or preset values,
- automatic bar code detection,
- print-out of stock lists or protocols, graphic user interface with intuitive user guidance, standard functions of modern storage facility management.

The concept of the print shop with the material flow system 05, which up to now has been produced from a technical processing and a data point of view, can be basically physically realized in different ways. The linkage or integration of the material flow system 05 to or in the internal network 09 of the printing press 01 and of the product planning system 03, as well as the data flow and the linking of the roll changers 06 and/or the inner loading circuit 31, are at the center of the following explanations. The signal connections 15 to the remaining subsystems 18, 19, 21, 22, 23, 24, 26, 27, to the extent provided is only shown by a number of two-headed arrows. In what follows, preferred embodiments of an advantageous linkage will be explained. However, the above mentioned concept is not limited to these.

When linking the material flow system 05 to the printing press 01, a distinction can basically be made in accordance with two points of view. For one, a differentiation can be made whether the data exchange between the printing press 01 and the material flow system 05 takes place, besides the connection to the management level 11, via a separate connection to the roll changer 06, or to the inner loading circuit 31, or whether the communication between the roll changer 06, or the inner loading circuit 31, and the material flow system 05 takes place via the internal printing press network 09 and the control console level. Secondly, a distinction can be made whether or not a homogeneous network has been formed between the control device 35 of the roll changer 06, or the inner loading circuit 31, the material flow system 05 and the control console level 11, i.e. a continuous connection based on the same protocol.

Figure 5:
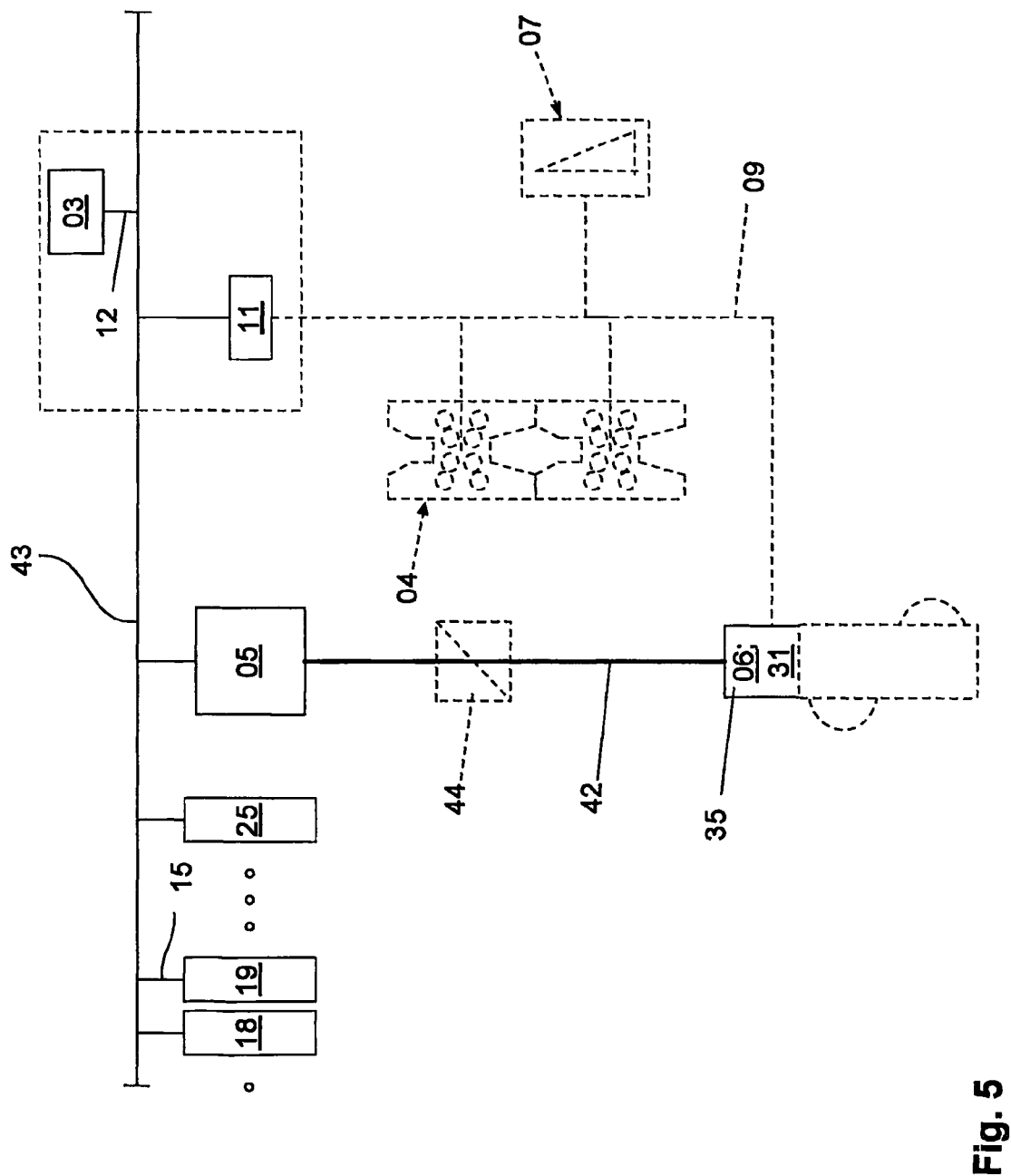

The physical linkage of the material flow system 05 to the printing press 01 and to the product planning system 03 is represented schematically in FIG. 5. Of the units of the printing press 01, only a single printing tower 04, a single folding apparatus 07, as well as a single roll changer 06 have been symbolically represented by dashed lines. These units 04, 07, 06 are in a signal connection, which is internal to the printing press, with each other and with the managing level 11 via an initially arbitrarily designed network 09, either homogeneously or heterogeneously only symbolically indicated by dashed lines in FIG. 5.

In the first preferred embodiment of the present invention in accordance with FIG. 5, the material flow system 05 is, for one, in contact, via a signal connection 42, which is different from the printing press-internal signal connection 09, with the control device 35 of the inner loading circuit 31 and/or of the roll changer 06. This control device 35 can also have two separate control circuits and/or can be embodied in two parts, wherein a connection between the parts then exists, and/or both parts are connected with the signal connection 42. Besides this, the material flow system 05 is connected, via a signal connection 43, with the management level 11 and with the product planning system 03. The functions of the management level 11 and of the product planning system 03 can also be configured structurally and possibly, with respect to the software, as one unit, as indicated by dashed lines. Thirdly, the material flow system 05 is in a signal connection 15 with the further sub-systems, to the extent that they are present and integrated, of the roll supply system 02. This embodiment of the architecture is distinguished in that the required communication between the material flow system 05 and the roll changer 06, or the inner loading circuit 31, is not "dragged through" the printing press-internal network 09. The roll changer 06, or the inner loading circuit 31 receives and transmits the data regarding production and the printing via the network 09, while the communication regarding the roll supply takes place via the signal connection 42. The embodiment of the connection 42 between the roll changer 06, or the inner loading circuit 31, and the material flow system 05 is independent of the embodiment of the interface, or of the connection 43, with the managing level 11 and/or the product planning system 03.

The linkage of the material flow system 05 to the sub-systems, to the managing level 11 and to the production planning 03 can basically take place via the individual interfaces and connections. In an advantageous embodiment of the present invention, the connection takes place over a common network 43, to which the material flow system 05, the subsystems, the managing level 11 and the product planning system 03 are linked as so-called clients. The common network or signal connection 43 is advantageously embodied in such a way that it is the same type as the interfaces of as many subsystems as possible, in the ideal case of all. The interfaces of the managing level 11 and of the production system 03 are of this type. In an advantageous embodiment, a random access method, and in particular the access method standardized in accordance with IEEE 802.3, is used as the access method. In this case, the network or signal connection 43 is configured as an ethernet, in particular of a bandwidth of 100 Mbit/s or more. Basically the communication can be based on the most varied protocols, but in an advantageous embodiment it is based on the TCP/IP protocol or is a socket connection.

For one, the above-described configuration of the network 43 contains advantages in view of the speed of the data transmission. Then, it makes it possible to connect all, or at least most subsystems of the roll supply system 02 without the requirement for a conversion of the protocol, for example by the use of a gateway, which would reduce the speed, since, in an advantageous embodiment, the subsystems, except for the roll changer 06, or the inner loading circuit 31, have an appropriately configured interface, and in particular, have an ethernet interface. This can also be provided for the roll changer 06 and/or for the inner loading circuit 31. Thirdly, such a configuration of the network 43 makes it possible, when required, to start the data bank and/or the data set access through it without the additional implementation of a data bank client being necessary.

In general, in an advantageous embodiment, the network or signal connection 43 and the printing press-internal network 09 can be configured as networks 09, 43 of the same type in a common homogeneous network 09, 49, with or without the formation of segments, with a common protocol family. This network 09, 43 can be configured in particular as an ethernet, at least a fast ethernet or a 100 Mbit ethernet of at least 100 Mbit/s, however, for insuring a low collision rate in the area of the printing press 01 in particular, as a gigabit ethernet with 1,000 Mbit/s or more.

In another advantageous embodiment of the present invention, the network 43 and the network 09 are configured differently, in accordance with their specific requirements. The printing press-internal network itself can possibly be additionally constructed heterogeneously, can access different protocol families and can have one or more protocol converters, or gateways. In the present example, at least areas of the network 09, inclusive of the linkage to the roll changer 06 and to the inner loading circuit 31, are embodied as a network 09 with deterministic access methods, in particular based on token passing, for example as an arcnet. Within the printing press 01, this assures the dependable transmission of time-critical data within dependable time windows, while excluding data collision to a large extent.

Since now there is a multi-protocol environment between the network 09 and the control device 35 of the roll changer 06, or the inner loading circuit 31, the connection of the roll changer 06, or the inner loading circuit 31, with the material flow system 05 has a protocol converter 44, or a gateway 44, which is shown in dashed lines in FIG. 5.

Because of the above-mentioned architecture, rapid communication of the material flow system 05, with the control console level 11, with the product planning system 03, and with the various subsystems is possible with little outlay.

Figure 6:
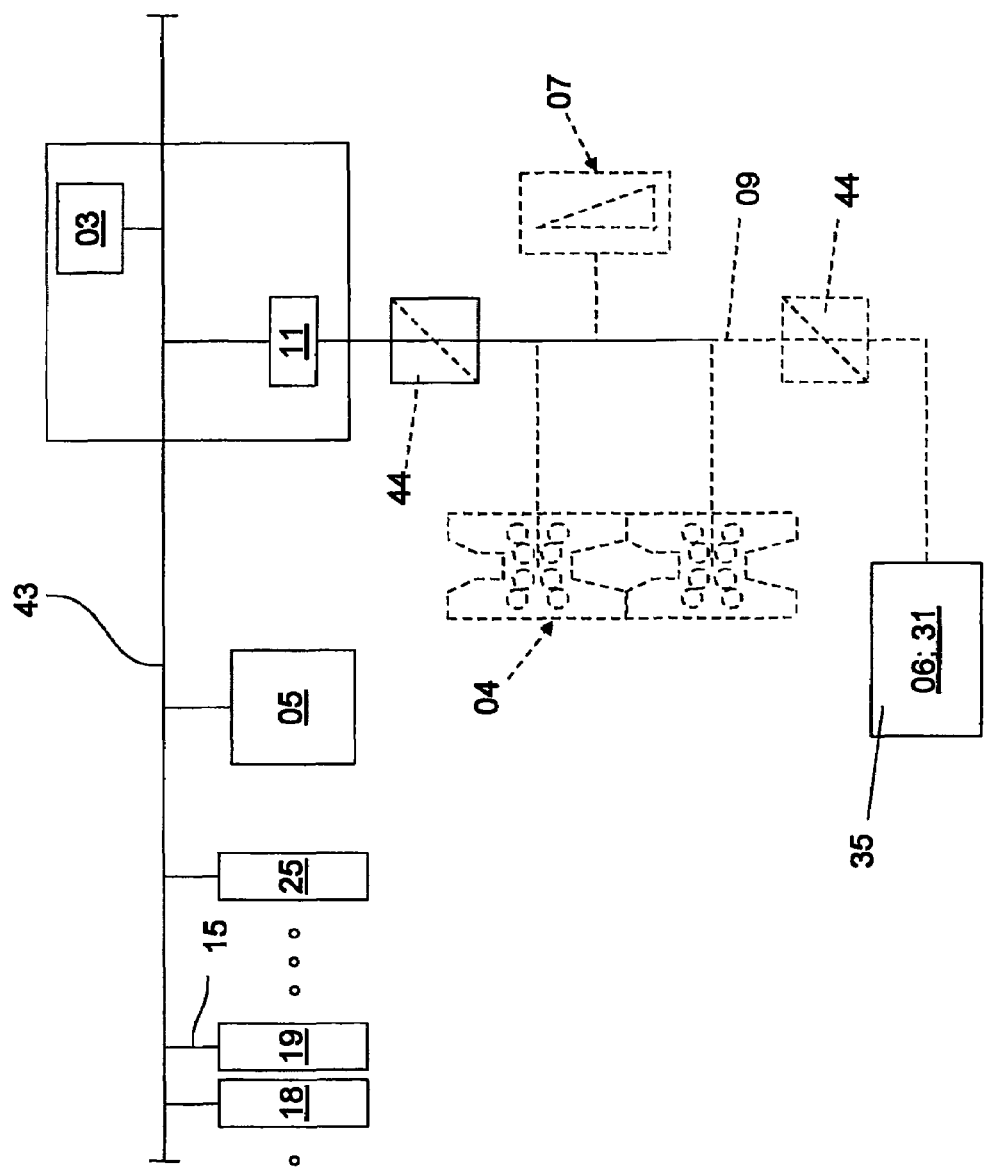

In a second preferred embodiment, as seen in FIG. 6, the linkage of the material flow system 05 to the roll changer 06, or to the inner loading circuit 31 is provided not by its own connection 42, but via the signal connection 43 to the management level 11 and via the printing press-internal network 09. Because of the use of a network 43, which is different from the network 09, an intermediate connection of a protocol converter 44, or gateway 44, which is shown in dashed lines is again necessary for this. The data relating to the handling of the rolls, or to the roll supply, are here conducted through the existing printing press-internal network 09. With this embodiment, it is of advantage that existing paths can be utilized. Slowing, which is caused by a greater network load and/or by a greater risk of collisions, must be accepted here. This slowing can be reduced by embodying the printing press-internal network 09 as a fast, broad-band bus system with token passing, or as a rapid ethernet, for example a gigabit ethernet.

Figure 7:
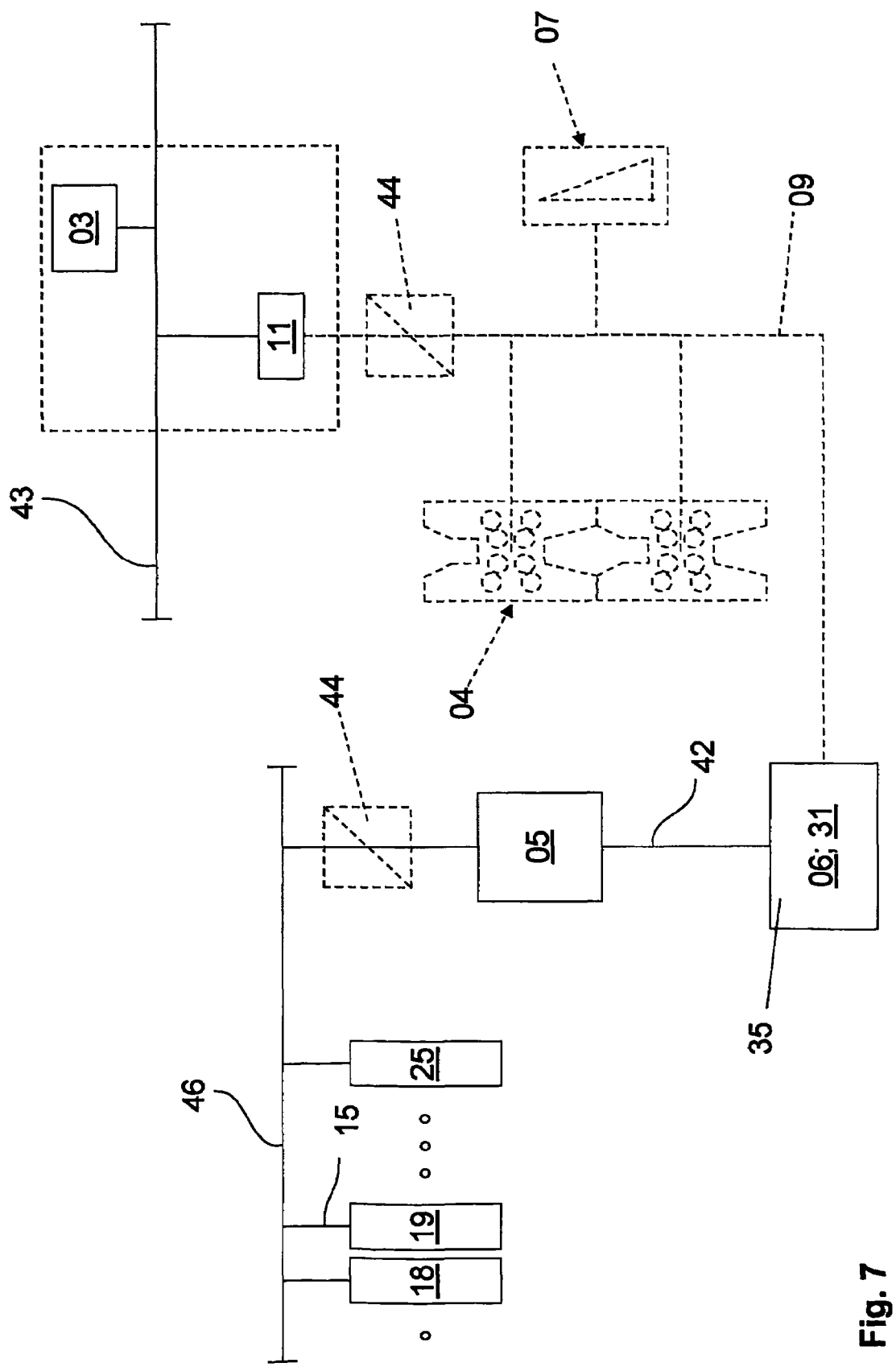

In a modification of the second preferred embodiment, the linkage of the material flow system 05, as shown in FIG. 7, does not take place directly via the network 43 to the managing level 11, but instead takes place via the printing press-internal network 09. The data exchange with the roll changer 06, or with the inner loading circuit 31, and the management level 11, or the product planning system 03 takes place in this embodiment via the connection 42. If a protocol exists in the area of the connection 42 with the material flow system 05, or between the material flow system 05 and the lower-order subsystems, which protocol is not suitable for processing in the material flow system 05 or in the transmission to the subsystems, the arrangement of a protocol converter 44, or a gateway 44, between the roll changer 06 and the material flow system 05, which is not specifically represented, or between the material flow system 05 and the lower-order subsystems, which is shown in dashed lines, is advantageous. The connection between the material flow system 05 and the subsystems can be provided via respective individual interfaces, or a connection configured as network 46.

Figure 8:
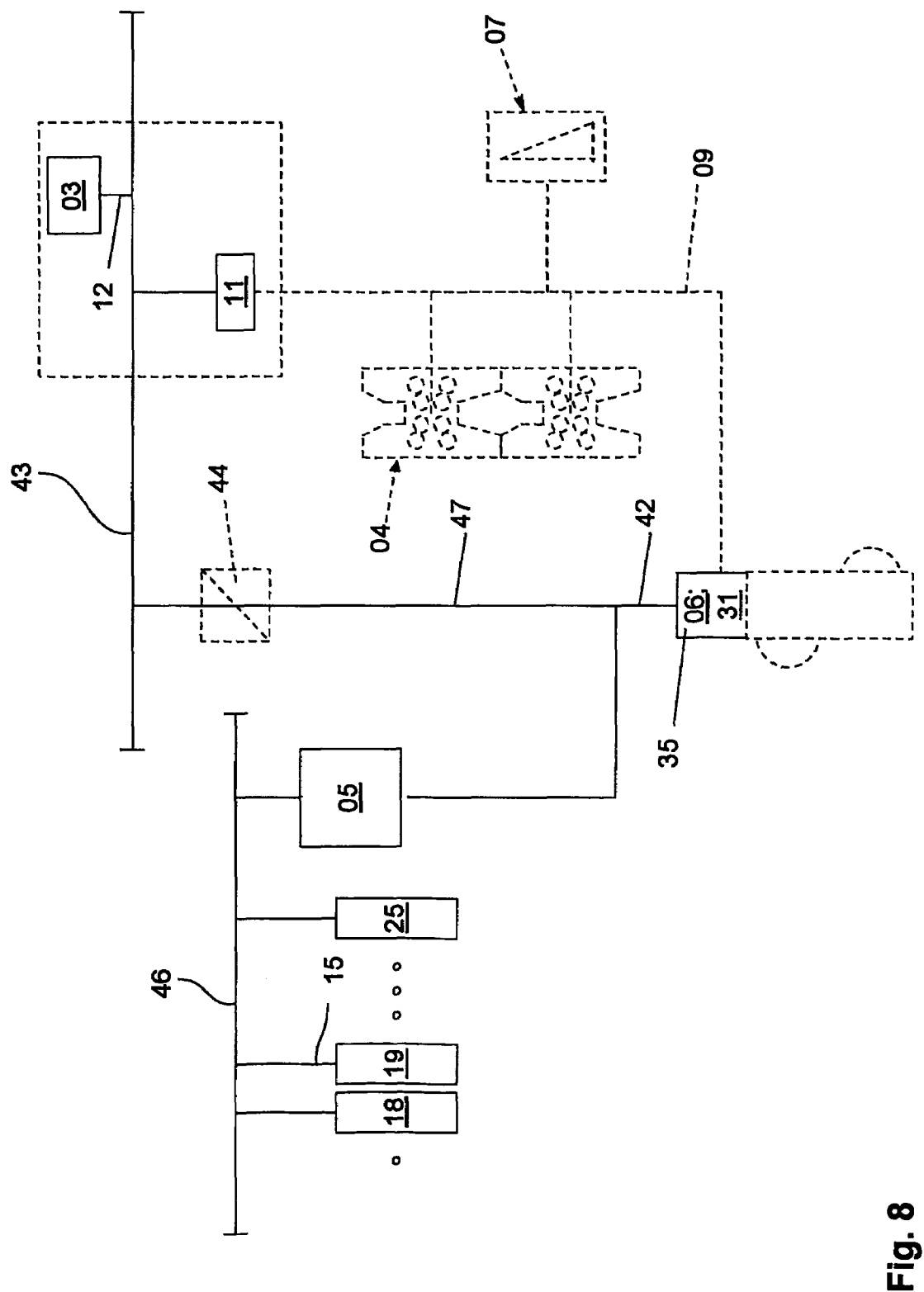

In a further modification, the linkage of the material flow system 05 with the management level 11, as depicted in FIG. 8, does not take place via the printing press-internal network 09, but like a connection 47, different from the printing press-internal network 09, with the network 43. In a multi-protocol environment between the network 09 and the network 43, the arrangement of a protocol converter 44, or a gateway 44, between the network 43 and the material flow system 05 is provided. The data exchange with the roll changer 06, or with the inner loading circuit 31 takes place via the connection 42. If a protocol exists, in the area of the connection 42 with the material flow system 05, or between the material flow system 05 and the lower-order subsystems, which is not suitable for processing in the material flow system 05 or in the transmission to the subsystems, the arrangement of a protocol converter 44, or a gateway 44, between the roll changer 06 and the material flow system 05, which is not specifically represented, or between the material flow system 05 and the lower-order subsystems, shown in dashed lines, is advantageous.

The connection between the material flow system 05 and the subsystems can be provided via respective individual interfaces, or a network 46.

The remarks made in connection with FIG. 5 regarding advantageous embodiments of the networks 09, 43 should be analogously applied to the embodiments of FIGS. 6 to 8.

While preferred embodiments of a method and devices for automatically supplying material to a processing machine, in accordance with the present invention, have been set forth fully and completely hereinabove, it will be apparent to one of skill in the art that various changes in, for example, the specific structure of the printing units, the types of roll changers used, and the like could be made without departing from the true spirit and scope of the present invention which is accordingly to be limited only by the appended claims.

What is claimed is:

1. A method for supplying paper rolls to a web-fed rotary printing press including:
   providing a paper roll supply system for said web-fed rotary printing press;
   providing a paper roll storage facility, in said paper roll supply system, for storing paper rolls;
   providing a paper roll transport system in said paper roll supply system;
   providing a material flow system for said web-fed rotary printing press;
   providing a coordination level in said material flow system and being in communication with said paper roll storage facility;
   providing a planning level in said material flow system and being in communication with said coordination level;
   receiving stock data regarding paper rolls available from said paper roll storage facility in said coordination level of said material flow system;
   providing a product planning system for said web-fed rotary printing press and having production-relevant planning data regarding pending and planned productions of said web-fed rotary printing press;
   providing a press management system having actual production data for said web-fed rotary printing press;
   transmitting said actual production data for said web-fed rotary printing press from said press management system, said stock data from said coordination level and said planning data from said product planning system to said planning level of said material flow system;
   developing a supply strategy, for use of said paper rolls stored in said roll storage facility, in said planning level of said material flow system using said actual production data from said press management system, said planning data from said product planning system and said stock data from said coordination level;
   using said supply strategy developed in said planning level for instructing said coordination level for preparing said paper rolls in said paper roll storage facility of said roll supply system for use in said web-fed rotary printing press; and
   using said paper roll transport system for supplying said paper rolls prepared in said paper roll storage facility in accordance with said supply strategy developed in said planning level to said web-fed rotary printing press.

2. The method of claim 1 further including providing a press management level in said product planning system and further including a fixed signal connection for transmitting data between said press management level and said material flow system.

3. The method of claim 1 including providing at least one fixed signal connection between said product planning system and said material flow system and transmitting data using said at least one fixed signal connection.

4. The method of claim 1 further including providing a data network connecting said paper roll supply system, said material flow system and said product planning system of said web-fed rotary printing press.

5. The method of claim 1 further including transmitting data between at least one of said caper roll storage facility and said paper roll transport system of said paper roll supply system and said material flow system and using said data transmitted to said material flow system for controlling said at least one of said paper roll storage facility and said paper roll transport system of said roll supply system.

6. The method of claim 4 further including using said data network for transmitting data from said web-fed rotary printing press and said product planning system to said material flow system and for transmitting data from said material flow system to at least one of said paper roll storage facility and said paper roll transport system in said roll supply system.

7. The method of claim 1 further including transmitting at least one of an identification of a product, a roll circumference, a time and a location of use of a planned product to said material supply system.

8. The method of claim 1 further including transmitting information regarding actual status of a running production of said web-fed rotary printing press as said actual production data.

9. The method of claim 8 further including transmitting identification of said running production and an assignment of said running production to a roll changer of said web-fed rotary printing press.

10. The method of claim 1 including providing at least one roll changer in said web-fed rotary printing press and transmitting roll transport data between said material flow system and said at least one roll changer using at least one fixed signal connection.

11. The method of claim 10 further including providing signal connection between said paper roll supply system and said product planning system different from said at least one fixed signal connection.

12. The method of claim 1 further including using said production-relevant planning data in said material flow system and determining a consumption amount.

13. The method of claim 1 further including storing said paper rolls in said paper roll storage facility and monitoring said stored paper rolls in said material flow system.

14. The method of claim 1 further including providing a flow control of said paper roll storage facility and said paper roll transport system in said paper roll supply system using said material flow system.

15. The method of claim 1 further including providing transport orders to said pacer roll storage facility and to said paper roll transport system of said paper roll supply system from said material flow system.

16. The method of claim 1 further including providing movement control and storage space management of said paper roll storage facility and said paper roll transport system of said paper roll supply system in said material flow system.

\* \* \* \* \*

UNITED STATES PATENT AND TRADEMARK OFFICE
CERTIFICATE OF CORRECTION

PATENT NO. : 7,463,943 B2  Page 1 of 1
APPLICATION NO. : 10/529416
DATED : December 9, 2008
INVENTOR(S) : Harald Karl Gretsch It is certified that error appears in the above-identified patent and that said Letters Patent is hereby corrected as shown below:

Col. 17, Claim 5, Line 2, after "said", change "caper" to --paper--;
Col. 18, Claim 11, Line 1, after "providing", insert --a--; and
Col. 18, Claim 15, Line 2, before "roll", change "pacer" to --paper--.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,463,943 B2  Page 1 of 1
APPLICATION NO. : 10/529416
DATED : December 9, 2008
INVENTOR(S) : Harald Karl Gretsch It is certified that error appears in the above-identified patent and that said Letters Patent is hereby corrected as shown below:

Col. 17, Claim 5, Line 8, after "said", change "caper" to --paper--;
Col. 18, Claim 11, Line 6, after "providing", insert --a--; and
Col. 18, Claim 15, Line 23, before "roll", change "pacer" to --paper--.

This certificate supersedes the Certificate of Correction issued April 7, 2009.

Signed and Sealed this

Twenty-eighth Day of April, 2009

JOHN DOLL
*Acting Director of the United States Patent and Trademark Office*